(12) United States Patent
Zhang

(10) Patent No.: US 10,320,894 B2
(45) Date of Patent: Jun. 11, 2019

(54) METHOD AND APPARATUS FOR ALLOCATING AVAILABILITY ZONE

(71) Applicant: BEIJING BAIDU NETCOM SCIENCE AND TECHNOLOGY CO., LTD., Beijing (CN)

(72) Inventor: Deyang Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 15/428,983

(22) Filed: Feb. 9, 2017

(65) Prior Publication Data

US 2018/0069921 A1 Mar. 8, 2018

(30) Foreign Application Priority Data

Sep. 5, 2016 (CN) .......................... 2016 1 0804192

(51) Int. Cl.
*H04L 29/08* (2006.01)
(52) U.S. Cl.
CPC ...... *H04L 67/1008* (2013.01); *H04L 67/1014* (2013.01)
(58) Field of Classification Search
CPC ................. H04L 67/1014; H04L 67/1008
See application file for complete search history.

(56) References Cited

U.S. PATENT DOCUMENTS 8,606,922 B1 * 12/2013 Greenfield ............ G06F 9/5027
709/226

FOREIGN PATENT DOCUMENTS

| CN | 104954277 A | 9/2015 |
| CN | 10567947 A | 5/2016 |

* cited by examiner

*Primary Examiner* — Kim T Nguyen
(74) *Attorney, Agent, or Firm* — Seed IP Law Group LLP

(57) ABSTRACT

The present application discloses a method and apparatus for allocating an availability zone. A specific implementation of the method includes: receiving an availability zone allocating request sent from a user terminal, the availability zone allocating request including a user identification and a target logical availability zone identification; matching the user identification and the target logical availability zone identification in an availability zone allocation table; acquiring weights of availability zones from a preset availability zone weight table, selecting a target availability zone from the availability zones by using a ratio of the weights of the availability zones to a sum of the weights of the availability zones as a selection probability, and allocating the target availability zone to the user terminal, in response to an unsuccessful matching of the user identification and the target logical availability zone identification in the availability zone allocation table.

15 Claims, 5 Drawing Sheets

METHOD AND APPARATUS FOR ALLOCATING AVAILABILITY ZONE

CROSS REFERENCE TO RELATED APPLICATION

This application claims the priority of Chinese Patent Application No. 201610804192.0, entitled "A Method and Apparatus for Allocating Availability Zone," filed by Baidu Online Network Technology (Beijing) Co., Ltd., on Sep. 5, 2016, the content of which is incorporated herein by reference in its entirety.

TECHNICAL FIELD

The present disclosure relates to the field of computer technology, specifically to the field of resource allocation technology, and more specifically to a method and apparatus for allocating an availability zone.

BACKGROUND

A data center is a globally coordinated, device-specific network used to deliver, accelerate, display, calculate and store data information across an Internet network infrastructure. A data center can be a multi-purpose building that may accommodate multiple servers and communication devices. These devices are usually placed together because they have the same environmental and physical security requirements and are placed in this way so that they can be easily maintained. An availability zone may include at least one data center, accordingly, the availability zone has greater availability, fault tolerance, and scalability than a single data center. A user may select an availability zone to create resources.

The existing availability zone allocation method generally allows a user to select an availability zone directly. However, the user does not know the resource usage of availability zones, and there is a problem of personal preference as to the selection of an availability zone. Therefore, the availability zone cannot provide the user with the resources needed by the user evenly, resulting in a waste of availability zone resources.

SUMMARY

An objective of the present application is to provide an improved method and apparatus for allocating an availability zone, in order to solve the technical problem mentioned in the foregoing Background section.

In a first aspect, the present application provides a method for allocating an availability zone, comprising: receiving an availability zone allocating request sent from a user terminal, the availability zone including at least one data center, the availability zone allocating request including a user identification and a target logical availability zone identification, the logical availability zone identification being an identification of a logical availability zone displayed to the user terminal; matching the user identification and the target logical availability zone identification in an availability zone allocation table, the availability zone allocation table including a user identification of an allocated availability zone, an availability zone identification and a logical availability zone identification of a user-terminal-allocated availability zone; acquiring weights of availability zones from a preset availability zone weight table, selecting a target availability zone from the availability zones by using a ratio of the weights of the availability zones to a sum of the weights of the availability zones as a selection probability, and allocating the target availability zone to the user terminal, in response to an unsuccessful matching of the user identification and the target logical availability zone identification in the availability zone allocation table.

In some embodiments, the method further comprises: acquiring a successfully matched availability zone identification of a user-terminal-allocated availability zone, and allocating an availability zone indicated by the successfully matched availability zone identification of the user-terminal-allocated availability zone to the user terminal, in response to a successful matching of the user identification and the target logical availability zone identification in the availability zone allocation table.

In some embodiments, the selecting a target availability zone from the availability zones by using a ratio of the weights of the availability zones to a sum of the weights of the availability zones as a selection probability comprises: generating a weight wheel diagram, wherein the weight wheel diagram is equally divided into a first preset number of sectors, the first preset number equaling to the sum of the weights of the availability zones, a number of sectors occupied by the availability zones in the weight wheel diagram equaling to the weights of the availability zones; generating a random number, and generating a random rotating sector number H utilizing the following formula: H=R % W; wherein R is the random number, W is the sum of the weights of the availability zones, and % is a complementation operator; presetting a starting point in the weight wheel diagram and rotating H sectors clockwise or anti-clockwise around the weight wheel diagram to reach a terminal point; defining an availability zone indicated by the terminal point as the target availability zone.

In some embodiments, before the acquiring weights of availability zones from a preset availability zone weight table, the method further comprises: analyzing statistically a remaining amount of resources of the availability zones, calculating the weights of the availability zones, and writing the weights in the availability zone weight table, wherein the weights of the availability zones are proportional to the remaining amount of resources of the availability zones In some embodiments, the availability zone weight table further comprises availability zone identifications of the availability zones, and the method further comprises: acquiring an availability zone identification of the target availability zone from the availability zone weight table.

In some embodiments, the method further comprises: writing the user identification, the target logical availability zone identification and the availability zone identification of the target availability zone respectively in the availability zone allocation table.

In a second aspect, the present application provides an apparatus for allocating an availability zone, comprising: a reception unit, configured to receive an availability zone allocating request sent from a user terminal, the availability zone including at least one data center, the availability zone allocating request including a user identification and a target logical availability zone identification, the logical availability zone identification being an identification of a logical availability zone displayed to the user terminal; a matching unit, configured to match the user identification and the target logical availability zone identification in an availability zone allocation table, the availability zone allocation table including a user identification of an allocated availability zone, an availability zone identification and a logical availability zone identification of a user-terminal-allocated availability zone; a selection unit, configured to acquire weights of availability zones from a preset availability zone weight table, select a target availability zone from the availability zones by using a ratio of the weights of the availability zones to a sum of the weights of the availability zones as a selection probability, and allocate the target availability zone to the user terminal, in response to an unsuccessful matching of the user identification and the target logical availability zone identification in the availability zone allocation table.

In some embodiments, the apparatus further comprises: a first acquisition unit, configured to acquire a successfully matched availability zone identification of a user-terminal-allocated availability zone, and allocate an availability zone indicated by the successfully matched availability zone identification of the user-terminal-allocated availability zone to the user terminal, in response to a successful matching of the user identification and the target logical availability zone identification in the availability zone allocation table.

In some embodiments, the selection unit comprises: a first generation subunit, configured to generate a weight wheel diagram, wherein the weight wheel diagram is equally divided into a first preset number of sectors, the first preset number equaling to the sum of the weights of the availability zones, a number of sectors occupied by the availability zones in the weight wheel diagram equaling to the weights of the availability zones; a second generation subunit, configured to generate a random number, and generate a random rotating sector number H utilizing the following formula: H=R % W; wherein R is the random number, W is the sum of the weights of the availability zones, and % is a complementation operator; a rotation subunit, configured to preset a starting point in the weight wheel diagram and rotate H sectors clockwise or anticlockwise around the weight wheel diagram to reach a terminal point; a definition subunit, configured to define an availability zone indicated by the terminal point as the target availability zone.

In some embodiments, the apparatus further comprises:
a statistical-analysis unit, configured to analyze statistically a remaining amount of resources of the availability zones; calculate the weights of the availability zones; and write the weights in the availability zone weight table, wherein the weights of the availability zones are proportional to the remaining amount of resources of the availability zones.

In some embodiments, the availability zone weight table further comprises availability zone identifications of the availability zones, and the apparatus further comprises: a second acquisition unit, configured to acquire an availability zone identification of the target availability zone from the availability zone weight table.

In some embodiments, the apparatus further comprises: a writing-in unit, configured to write the user identification, the target logical availability zone identification and the availability zone identification of the target availability zone respectively in the availability zone allocation table.

By first matching a user identification and a target logical availability zone identification in an availability zone allocating request sent from a user terminal in an availability zone allocation table, upon an unsuccessful matching, acquiring weights of availability zones from a preset availability zone weight table, then selecting a target availability zone from the availability zones by using a ratio of the weights of the availability zones to a sum of the weights of the availability zones as a selection probability, and lastly allocating the target availability zone to the user terminal for the user terminal to use resources of the target availability zone, the method and apparatus for allocating an availability zone provided by the present application achieves the availability zone evenly providing the user with the resources needed by the user and avoids waste of availability zone resources.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
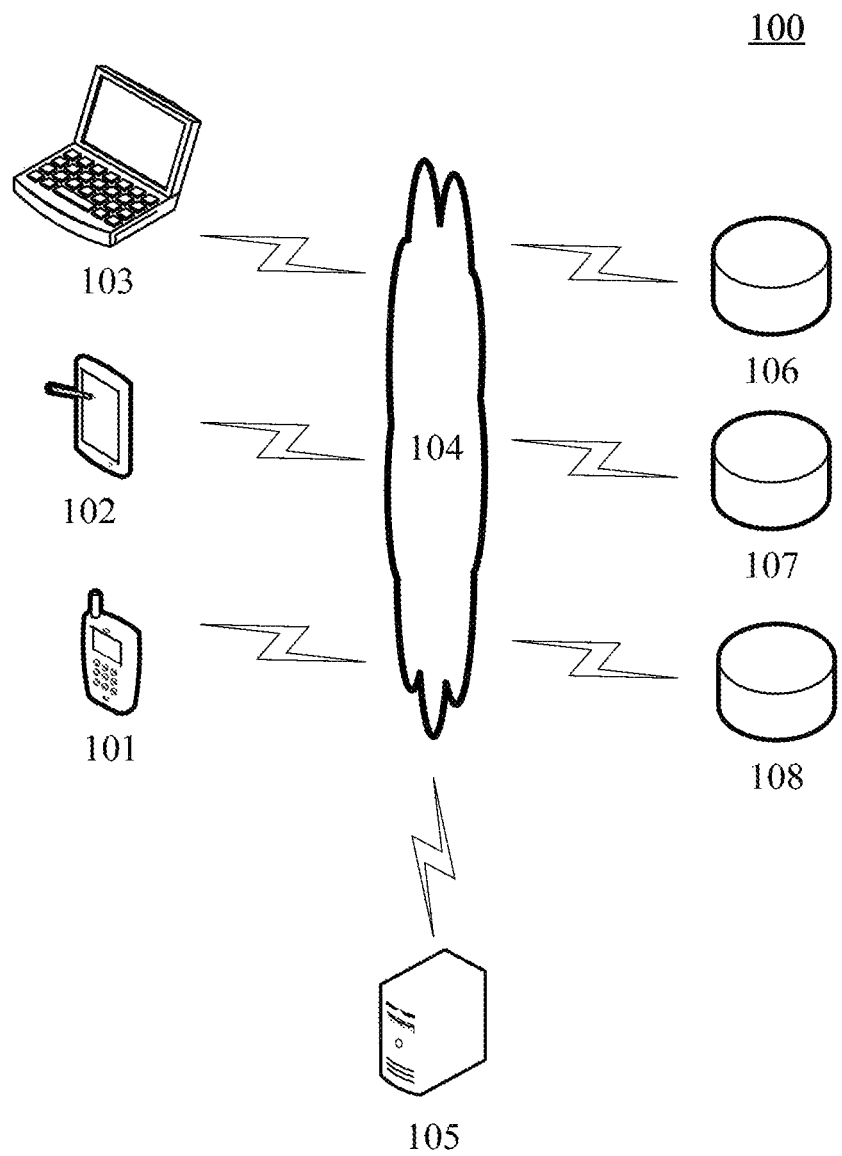
FIG. 1 is an architectural diagram of an exemplary system in which the present application may be implemented.

FIG. 1 shows an exemplary system architecture 100 which may be used by an availability zone allocating method or an availability zone allocating apparatus according to an embodiment of the present application.

As shown in FIG. 1, the system architecture 100 may include terminal devices 101, 102 and 103, a network 104, a server 105 and availability zones 106, 107 and 108. The network 104 serves as a medium providing a communication link between the terminal devices 101, 102 and 103, the server 105 and the availability zones 106, 107 and 108. The network 104 may include various types of connections, such as wired or wireless communication links, or optical fibers and the like.

The user may use the terminal devices 101, 102 and 103 to interact with the server 105 through the network 104, in order to transmit or receive messages, etc. The user may also use the terminal devices 101, 102 and 103 to interact with the availability zones 106, 107 and 108 through the network 104, in order to use resources of the availability zones.

The terminal devices 101, 102 and 103 may be various electronic devices supporting using resources of the availability zones, including but not limited to, smart phones, tablet computers, laptop computers and desktop computers.

The server 105 may be a server providing various services, e.g., a backend availability zone allocating server which provides support on availability zone allocation for the terminal devices 101, 102 and 103, and allocates a selected availability zone to the terminal devices for the terminal devices to use its resources. The server 105 may also be a backend availability zone weight calculating server which provides support on calculating weight of an availability zone for the availability zones 106, 107 and 108. The backend availability zone weight calculating server may first acquire a remaining amount of resources of the availability zones 106, 107 and 108, then calculates the weights of the availability zones 106, 107 and 108, and write the weights in the availability zone weight table of the backend availability zone weight calculating server.

Any one of the availability zones 106, 107 and 108 may include at least one data center. The server 105 may select an availability zone for the terminal devices from the availability zones 106, 107 and 108 for the user to use its resources.

It should be noted that the method for allocating an availability zone provided by the embodiment of the present application is generally executed by the server 105, and accordingly, an apparatus for allocating an availability zone is generally installed in the server 105.

It should be appreciated that the numbers of the terminal devices, the networks, the servers and the availability zones in FIG. 1 are merely illustrative. Any number of terminal devices, networks, servers and availability zones may be provided based on the actual requirements.

Figure 2:
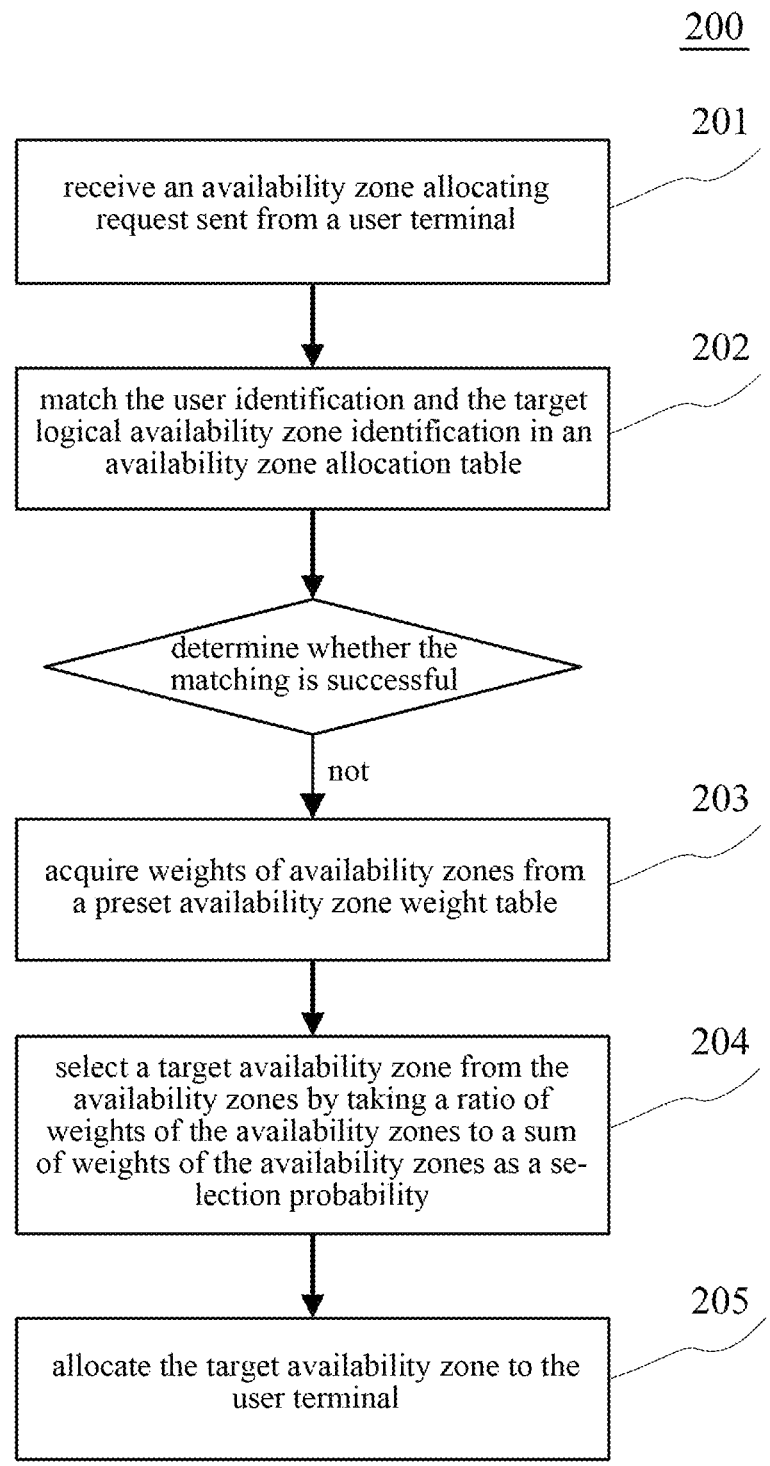
FIG. 2 is a flowchart of a method for allocating an availability zone according to an embodiment of the present application.

With further reference to FIG. 2, a flow 200 of the method for allocating an availability zone according to an embodiment of the present application is illustrated. The method for allocating an availability zone comprises the following steps:

Step 201, receive an availability zone allocating request sent from a user terminal.

In this embodiment, an electronic device (e.g., the server 105 as illustrated in FIG. 1) on which the method for allocating an availability zone operate may receive an availability zone allocating request sent from a user terminal through a wired or wireless connection, wherein the availability zone includes at least one data center, the availability zone allocating request including a user identification and a target logical availability zone identification, the logical availability zone identification being an identification of a logical availability zone displayed to the user terminal. The target logical availability zone identification may be an identification of a logical user-terminal-allocated availability zone.

In this embodiment, the user identification may be the only ID (Identification) to identify the user. The logical availability zone identification is different from the availability zone identification. The logical availability zone identification is an identification displayed to the user, rather than an identification of a real availability zone. The availability zone identification is an identification of a real availability zone. The availability zone identification is not displayed to the user. The number of logical availability zones and the number of availability zones may be the same, and there is a certain dynamic mapping relationship between the logical availability zone and the availability zone, which can hide details of the availability zone from the user and ensure the information security of the availability zone.

In general, the logical availability zone identification may be stored in a logical availability zone table. In practice, users can be divided into ordinary users and VIP users. Different types of users may own a different number of logical availability zones, accordingly, the logic availability zone table may also store a user identification correspondingly. The user may first query the logical availability zone table through the user identification, acquire all the logical availability zone identifications owned by the user, and select a target logical availability zone identification from them according to his/her own preference to initiate an availability zone allocating request.

It should be noted that, in this embodiment, the same user may send an availability zone allocating request once at the same time to ensure as much as possible that the availability zone allocation results do not conflict.

Step 202, match the user identification and the target logical availability zone identification in an availability zone allocation table.

In this embodiment, based on the user identification and the target logical availability zone identification in the availability zone allocating request acquired in step 201, the electronic device (e.g., the server 105 as illustrated in FIG. 1) may match the user identification and the target logical availability zone identification in an availability zone allocation table, wherein the availability zone allocation table includes a user identification of an allocated availability zone, an availability zone identification and a logical availability zone identification of a user-terminal-allocated availability zone.

In this embodiment, the user identification and the target logical availability zone identification are in turn and respectively matched with a user identification of an allocated availability zone and a logical availability zone identification allocated to a user terminal in the availability zone allocation table. If there is a user identification of an allocated availability zone and a logical availability zone identification allocated to a user terminal in the availability zone allocation table same to the user identification and the target logical availability zone identification respectively, the matching is successful, otherwise the matching is unsuccessful.

Step 203, acquire weights of availability zones from a preset availability zone weight table, in response to an unsuccessful matching of the user identification and the target logical availability zone identification in the availability zone allocation table.

In this embodiment, if the user identification and the target logical availability zone identification are not successfully matched in the availability zone allocation table, the electronic device (e.g., the server 105 as illustrated in FIG. 1) may acquire weights of availability zones from a preset availability zone weight table, wherein the availability zone weight table is a preset data table used to store weights of availability zones. The weights of the availability zones in the availability zone weight table may be updated in real time or updated on schedule and is not limited in this application.

In some optional implementations of this embodiment, the electronic device (e.g., the server 105 as illustrated in FIG. 1) may analyze statistically a remaining amount of resources of the availability zones, calculate the weights of the availability zones, and write the weights in the availability zone weight table, wherein the weights of the availability zones are proportional to the remaining amount of resources of the availability zones. For example, a remaining amount of resources of an availability zone may be acquired by calculating a difference between a total amount of resources of the availability zone and an occupied amount of resources of the availability zone.

In general, when calculating a weight of an availability zone, in addition to remaining amount of resources of availability zones, costs and/or status of availability zones may also be meanwhile considered, wherein costs may include but is not limited to at least one of the following: rent, equipment, electricity, water and manpower. The status of an availability zone may be divided into normal in use, about to logout, logout, not yet login and the like. The weight of a logout or not yet login availability zone may be directly set to 0. The weight of an about to logout availability zone may be reduced or even set to 0, to prevent allocating the user to an about to logout availability zone.

Optionally, the remaining amount of resources and the costs of the availability zones may be statistically analyzed to calculate the weights of the availability zones. For example, first a weight $a_1$ may be calculated based on a remaining amount of resources of an availability zone, wherein the weight $a_1$ is proportional to the remaining amount of resources of the availability zone; secondly, a weight $a_2$ may be calculated based on costs of the availability zone, wherein the weight $a_2$ is inversely proportional to the costs of the availability zone, and corresponding weight coefficients m and n may be respectively set for the weight $a_1$ and weight $a_2$; lastly, a weight a of the availability zone may be calculated according to the following formula: $a=m \times a_1 + n \times a_2$.

Optionally, the remaining amount of resources and the status of the availability zones may be statistically analyzed to calculate the weights of the availability zones. For example, first a weight $a_1$ may be calculated based on a remaining amount of resources of an availability zone, wherein the weight $a_1$ is proportional to the remaining amount of resources of the availability zone; secondly, a weight $a_3$ may be calculated based on the status of the availability zone, wherein the weight $a_3$ of a normal in use availability zone may be set to 1, the weight $a_3$ of a logout or not yet login availability zone may be directly set to 0, the weight $a_3$ of an about to logout availability zone may be reduced or even set to 0; lastly, a weight a of the availability zone may be calculated according to the following formula: $a=a_1 \times a_3$.

Optionally, the resource usage, costs, and status of the availability zones may be statistically analyzed to calculate the weights of the availability zones. For example, first a weight $a_1$ may be calculated based on a remaining amount of resources of an availability zone, wherein the weight $a_1$ is proportional to the remaining amount of resources of the availability zone; secondly, a weight $a_2$ may be calculated based on costs of the availability zone, wherein the weight $a_1$ is inversely proportional to the costs of the availability zone, and corresponding weight coefficients m and n may be respectively set for the weight $a_1$ and weight $a_2$; a weight $a_3$ may be calculated based on the status of the availability zone, wherein the weight $a_3$ of a normal in use availability zone may be set to 1, the weight $a_3$ of a logout or not yet login availability zone may be directly set to 0, the weight $a_3$ of an about to logout availability zone may be reduced or even set to 0; lastly, a weight a of the availability zone may be calculated according to the following formula:

$$a=(m \times a_1 + n \times a_2) \times a_3.$$

Step 204, select a target availability zone from the availability zones by using a ratio of the weights of the availability zones to a sum of the weights of the availability zones as a selection probability.

In this embodiment, based on the weights of the availability zones acquired in step 203, the electronic device (e.g., the server 105 as illustrated in FIG. 1) may first calculate a ratio of the weights of the availability zones to a sum of the weights of the availability zones as a selection probability, to select a target availability zone from the availability zones, wherein each availability zone may be selected as the target availability zone, except that the probability of being selected as the target availability zone is different for each availability zone. The greater the ratio of the weight of the availability zone to the sum of the weights of the availability zones, the greater the probability that the availability zone is selected as the target availability zone.

In some optional implementations of this embodiment, the availability zone weight table may further include availability zone identifications of the availability zones, and the electronic device (e.g., the server 105 as illustrated in FIG. 1) may acquire an availability zone identification of the target availability zone from the availability zone weight table, wherein availability zone identifications of the availability zones and the weights of the availability zones are one-to-one correspondence stored in the availability zone weight table. The availability zone identification of the target availability zone may also be acquired while the target availability zone is being selected by using the ratio of the weights of the availability zones to the sum of the weights of the availability zones as the selection probability.

Step 205, allocate the target availability zone to the user terminal.

In this embodiment, based on the target availability zone selected in step 204, the electronic device (e.g., the server 105 as illustrated in FIG. 1) may allocate the target availability zone to the user terminal for the user terminal to use resources of the target availability zone.

In some optional implementations of this embodiment, a successfully matched availability zone identification of a user-terminal-allocated availability zone is acquired, and an availability zone indicated by the successfully matched availability zone identification of the user-terminal-allocated availability zone is allocated to the user terminal, in response to a successful matching of the user identification and the target logical availability zone identification in the availability zone allocation table. In the availability zone allocation table, a user identification of an allocated availability zone, an availability zone identification and a logical availability zone identification of a user-terminal-allocated availability zone are stored one-to-one correspondence. Accordingly, upon a successful matching of the user identification and the target logical availability zone identification in the availability zone allocation table, the successfully matched availability zone identification of the user-terminal-allocated availability zone may be acquired, and the availability zone indicated by the successfully matched availability zone identification of the user-terminal-allocated availability zone may be allocated to the user terminal for the user to use its resources. In this way, it achieves that when the same user selects the same logical availability zone to initiate an availability zone allocating request, the same availability zone is allocated to the user for the user to use its resources, which facilitates management and ensures low latency for access.

In some optional implementations of this embodiment, the electronic device (e.g., the server 105 as illustrated in FIG. 1) may write the user identification, the target logical availability zone identification and the availability zone identification of the target availability zone respectively in the availability zone allocation table, which achieves real-time update of the availability zone allocation table.

Figure 3:
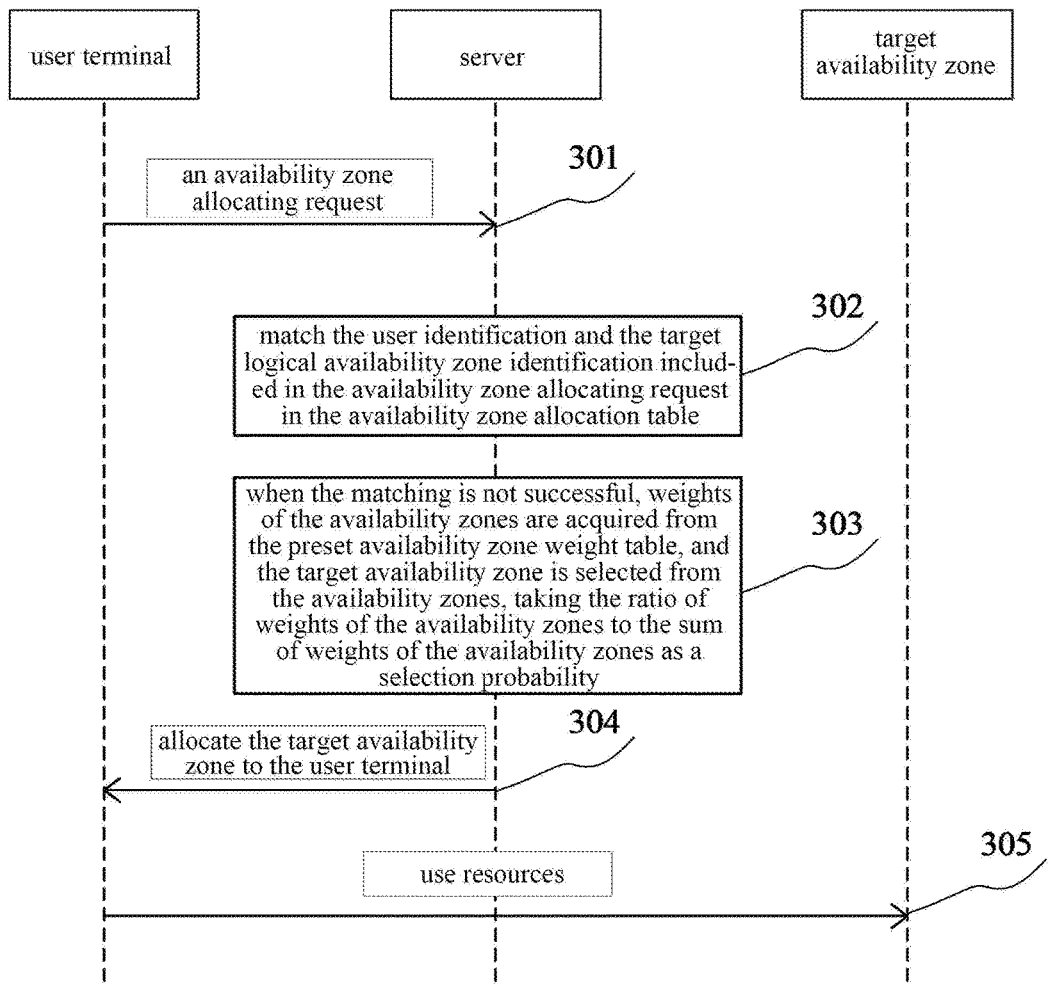
FIG. 3 is a signalling diagram of the method for allocating an availability zone according to the present application.

With further reference to FIG. 3, a signalling diagram of the method for allocating an availability zone according to this embodiment is illustrated. In the signalling diagram of FIG. 3, as shown by 301, the user terminal initiates an availability zone allocating request; as shown by 302, the server may match the user identification and the target logical availability zone identification included in the availability zone allocating request in the availability zone allocation table; as shown by 303, when the matching is not successful, the weights of the availability zones are acquired from the preset availability zone weight table, and the target availability zone is selected from the availability zones, using the ratio of the weights of the availability zones to the sum of the weights of the availability zones as a selection probability; as shown by 304, the server allocates the target availability zone to the user terminal; as shown by 305, the user terminal uses resources of the target availability zone.

By selecting the target availability zone from the availability zones using the ratio of the weights of the availability zones to the sum of the weights of the availability zones as the selection probability, the method provided by the above embodiment of the present application achieves the availability zone evenly providing the user with the resources needed by the user and avoids waste of availability zone resources.

Figure 4:
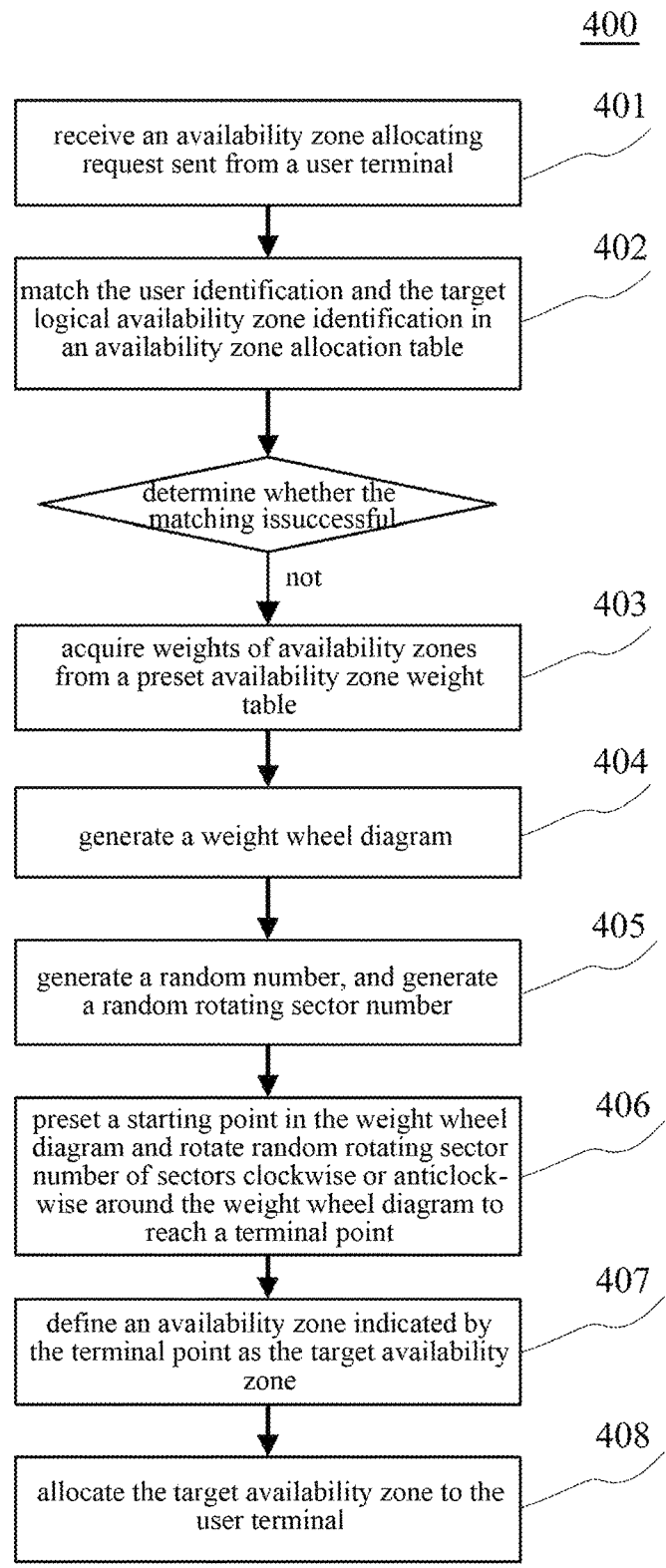
FIG. 4 is a flowchart of the method for allocating an availability zone according to another embodiment of the present application.

With further reference to FIG. 4, a flow 400 of the method for allocating an availability zone according to another embodiment of the present application is illustrated. The flow 400 of the method for allocating an availability zone includes the following steps:

Step 401, receive an availability zone allocating request sent from a user terminal.

In this embodiment, the electronic device (e.g., the server 105 as illustrated in FIG. 1) on which the method for allocating an availability zone operate may receive an availability zone allocating request sent from a user terminal through a wired or wireless connection, wherein the availability zone includes at least one data center, the availability zone allocating request including a user identification and a target logical availability zone identification, the logical availability zone identification being an identification of a logical availability zone displayed to the user terminal.

Step 402, match the user identification and the target logical availability zone identification in an availability zone allocation table.

In this embodiment, based on the user identification and the target logical availability zone identification in the availability zone allocating request acquired in step 401, the electronic device (e.g., the server 105 as illustrated in FIG. 1) may match the user identification and the target logical availability zone identification in the availability zone allocation table, wherein the availability zone allocation table includes a user identification of an allocated availability zone, an availability zone identification and a logical availability zone identification of a user-terminal-allocated availability zone.

Step 403, acquire weights of availability zones from a preset availability zone weight table, in response to an unsuccessful matching of the user identification and the target logical availability zone identification in the availability zone allocation table.

In this embodiment, if the user identification and the target logical availability zone identification are not successfully matched in the availability zone allocation table, the electronic device (e.g., the server 105 as illustrated in FIG. 1) may acquire weights of availability zones from a preset availability zone weight table.

Step 404, generate a weight wheel diagram.

In this embodiment, based on the weights of the availability zones acquired in step 403, the electronic device (e.g., the server 105 as illustrated in FIG. 1) may generate a weight wheel diagram, wherein the weight wheel diagram is equally divided into a first preset number of sectors, the first preset number equaling to the sum of the weights of the availability zones, the number of sectors occupied by the availability zones in the weight wheel diagram equaling to the weights of the availability zones, that is, the proportion occupied by the availability zones in the weight wheel diagram is equal to a ratio of the weights of the availability zones to the weights of the availability zones.

Step 405, generate a random number, and generate a random rotating sector number H utilizing the following formula:

$$H = R \% W.$$

In this embodiment, the electronic device (e.g., the server 105 as illustrated in FIG. 1) may first generate a random number, and generate a random rotating sector number based on the random number, wherein R is the random number, W is the sum of the weights of the physical availability zones, and % is a complementation operator.

In this embodiment, the random number may be generated using a random number generating function in C, C++, C #, Java and other programming language and software. The range of the random numbers is [0, max], and the max should be no less than W. For example, the range of the random number is [0, 1000], the generated random number R is 89, and W is 10, so the random rotating sector number H is 9.

Step 406, preset a starting point in the weight wheel diagram and rotate H sectors clockwise or anticlockwise around the weight wheel diagram to reach a terminal point.

In this embodiment, based on the random rotating sector number generated in step 405, the electronic device (e.g., the server 105 as illustrated in FIG. 1) may first preset a starting point in the weight wheel diagram, then rotate random rotating sector number of sectors clockwise or anticlockwise around the weight wheel diagram to reach a terminal point. For example, the weight wheel diagram has 10 sectors in total. Preset a starting point, the sector indicated by the starting point is number 0, and clockwise sequentially are other sector numbers 1-9. When the random rotating sector number H is 9, 9 sectors are rotated clockwise around the weight wheel diagram starting from the preset starting point, and the terminal point falls on a sector numbered 9.

Step 407, define an availability zone indicated by the terminal point as the target availability zone.

In this embodiment, based on the terminal point in step 406, the electronic device (e.g., the server 105 as illustrated in FIG. 1) may define an availability zone indicated by the terminal point as the target availability zone. For example, the terminal point falls on a sector numbered 9, and the availability zone indicated by the sector numbered 9 is the target availability zone.

Step 408, allocate the target availability zone to the user terminal.

In this embodiment, based on the target availability zone selected in step 407, the electronic device (e.g., the server 105 as illustrated in FIG. 1) may allocate the target availability zone to the user terminal.

As shown in FIG. 4, comparing with the embodiment corresponding to FIG. 2, the flow 400 of the method for allocating an availability zone of this embodiment highlights the step of selecting the target availability zone. Therefore, the solution described by this embodiment may select a target availability zone more conveniently and quickly.

Figure 5:
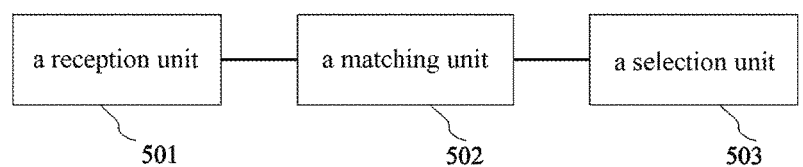
FIG. 5 is a schematic structural diagram of an apparatus for allocating an availability zone according to an embodiment of the present application.

With further reference to FIG. 5, as an implementation to the methods illustrated in the above figures, the present application provides an embodiment of an apparatus for allocating an availability zone. The apparatus embodiment corresponds to the method embodiment illustrated in FIG. 2, and is particularly applicable to various electronic devices.

As shown in FIG. 5, the apparatus 500 for allocating an availability zone of this embodiment includes: a reception unit 501, a matching unit 502 and a selection unit 503, wherein the reception unit 501 is configured to receive an availability zone allocating request sent from a user terminal, wherein the availability zone includes at least one data center, the availability zone allocating request including a user identification and a target logical availability zone identification, the logical availability zone identification being an identification of a logical availability zone displayed to the user terminal. The matching unit 502 is configured to match the user identification and the target logical availability zone identification in an availability zone allocation table, wherein the availability zone allocation table includes a user identification of an allocated availability zone, an availability zone identification and a logical availability zone identification of a user-terminal-allocated availability zone. The selection unit 503 is configured to acquire weights of availability zones from a preset availability zone weight table, select a target availability zone from the availability zones by using a ratio of the weights of the availability zones to a sum of the weights of the availability zones as a selection probability, and allocate the target availability zone to the user terminal, in response to an unsuccessful matching of the user identification and the target logical availability zone identification in the availability zone allocation table.

In this embodiment, the reception unit 501 of the apparatus for allocating an availability zone may receive an availability zone allocating request sent from a user terminal through a wired or wireless connection, wherein the availability zone includes at least one data center, the availability zone allocating request including a user identification and a target logical availability zone identification, the logical availability zone identification being an identification of a logical availability zone displayed to the user terminal.

In this embodiment, based on the user identification and the target logical availability zone identification in the availability zone allocating request acquired in the reception unit 501, the matching unit 502 may match the user identification and the target logical availability zone identification in the availability zone allocation table, wherein the availability zone allocation table includes a user identification of an allocated availability zone, an availability zone identification and a logical availability zone identification of a user-terminal-allocated availability zone.

In this embodiment, based on an unsuccessful matching in the matching unit 502, the selection unit 503 may first acquire weights of availability zones from a preset availability zone weight table, then select a target availability zone from the availability zones by using a ratio of the weights of the availability zones to a sum of the weights of the availability zones as a selection probability, and lastly allocate the target availability zone to the user terminal.

In some optional implementations of this embodiment, the apparatus 500 further includes: a first acquisition unit, configured to acquire a successfully matched availability zone identification of a user-terminal-allocated availability zone to a user terminal, and allocate an availability zone indicated by the successfully matched availability zone identification of the user-terminal-allocated availability zone to the user terminal, in response to a successful matching of the user identification and the target logical availability zone identification in the availability zone allocation table.

In some optional implementations of this embodiment, the selection unit includes: a first generation subunit, configured to generate a weight wheel diagram, wherein the weight wheel diagram is equally divided into a first preset number of sectors, the first preset number equaling to the sum of the weights of the availability zones, the number of sectors occupied by the availability zones in the weight wheel diagram equaling to the weights of the availability zones; a second generation subunit, configured to generate a random number, and generate a random rotating sector number H utilizing the following formula: H=R % W, wherein R is the random number, W is the sum of the weights of the availability zones, and % is a complementation operator; a rotation subunit, configured to preset a starting point in the weight wheel diagram and rotate H sectors clockwise or anticlockwise around the weight wheel diagram to reach a terminal point; and a definition subunit, configured to define an availability zone indicated by the terminal point as the target availability zone.

In some optional implementations of this embodiment, the apparatus 500 further includes: a statistical-analysis unit, configured to analyze statistically a remaining amount of resources of the availability zones, calculate the weights of the availability zones, and write the weights in the availability zone weight table, wherein the weights of the availability zones are proportional to the remaining amount of resources of the availability zones.

In some optional implementations of this embodiment, the availability zone weight table further includes availability zone identifications of the availability zones, and the apparatus 500 further comprises: a second acquisition unit, configured to acquire an availability zone identification of the target availability zone from the availability zone weight table.

In some optional implementations of this embodiment, the apparatus 500 further includes: a writing-in unit, configured to write the user identification, the target logical availability zone identification and the availability zone identification of the target availability zone respectively in the availability zone allocation table.

Hereinafter, reference is made to FIG. 6, which illustrates a schematic structural diagram of a computer system 600 adapted to implement the server of the embodiments of the present application.

Figure 6:
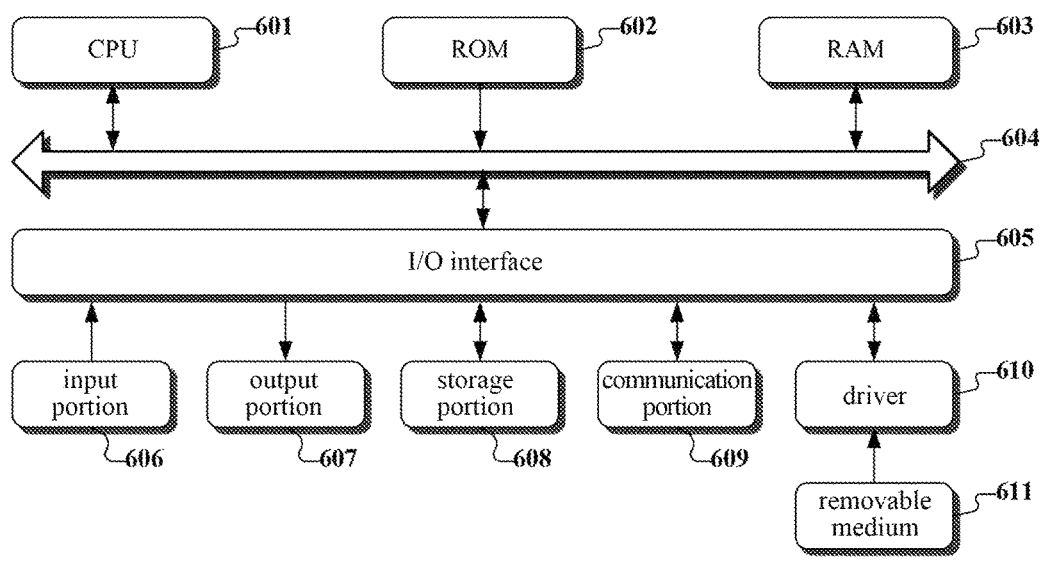
FIG. 6 is a schematic structural diagram of a computer system adapted to implement a server of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 609, and/or may be installed from the removable media 611. When the computer program is executed by the CPU 601, the above function defined by the method of the present application is implemented.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units according to the embodiments of the present application may be implemented by software or hardware. The described units may be disposed in the processors. For example, a following description may be made. A processor comprises an reception unit, a matching unit and a selection unit. The names of these units are not intended to limit the corresponding units. For example, the reception unit may also be referred to as a unit for receiving an availability zone allocating request sent by a user terminal.

In another aspect, the present application further provides a nonvolatile computer storage medium. The nonvolatile computer storage medium may be the nonvolatile computer storage medium included in the apparatus in the above embodiments, or a stand-alone nonvolatile computer storage medium which has not been assembled into the apparatus. The nonvolatile computer storage medium stores one or more programs. When the one or more programs are executed by an apparatus, the apparatus is caused to perform: receiving an availability zone allocating request sent by a user terminal, wherein the availability zone including at least one data center, the availability zone allocating request including a user identification and a target logical availability zone identification, the logical availability zone identification being an identification of a logical availability zone displayed to the user terminal; matching the user identification and the target logical availability zone identification in an availability zone allocation table, the availability zone allocation table including a user identification of an allocated availability zone, an availability zone identification and a logical availability zone identification of a user-terminal-allocated availability zone; acquiring weights of availability zones from a preset availability zone weight table, selecting a target availability zone from the availability zones by using a ratio of the weights of the availability zones to a sum of the weights of the availability zones as a selection probability, and allocating the target availability zone to the user terminal, in response to an unsuccessful matching of the user identification and the target logical availability zone identification in the availability zone allocation table.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for allocating an availability zone, the method comprising:

receiving an availability zone allocating request sent from a user terminal, the availability zone including at least one data center, the availability zone allocating request including a user identification and a target logical availability zone identification, a logical availability zone identification being an identification of a logical availability zone displayed to the user terminal;

matching the user identification and the target logical availability zone identification with a user identification allocated with an availability zone and a logical availability zone identification of the availability zone allocated to the user terminal in an availability zone allocation table, the availability zone allocation table further including an availability zone identification of the availability zone allocated to the user terminal; and acquiring weights of availability zones from a preset availability zone weight table, selecting a target availability zone from the availability zones by using a ratio of a weight of an availability zone to a sum of the weights of the availability zones as a selection probability, and allocating the target availability zone to the user terminal, in response to an unsuccessful matching of the user identification and the target logical availability zone identification with the availability zone allocation table;

wherein the selecting a target availability zone from the availability zones by using a ratio of a weight of an availability zone to a sum of the weights of the availability zones as a selection probability comprises:
  generating a weight wheel diagram, wherein the weight wheel diagram is equally divided into a first preset number of sectors, the first preset number of sectors equaling to the sum of the weights of the availability zones, a number of sectors occupied by an availability zone in the weight wheel diagram equaling to a weight of the availability zone;
  generating a random number, and generating a random rotating sector number H utilizing the following formula:

$$H=R \% W$$

wherein R is the random number, W is the sum of the weights of the availability zones, and % is a complementation operator;
  presetting a starting point in the weight wheel diagram and rotating H number of sectors clockwise or anti-clockwise around the weight wheel diagram to reach a terminal point; and
  defining an availability zone indicated by the terminal point as the target availability zone.

2. The method according to claim 1, further comprising:
  acquiring a successfully matched availability zone identification of the availability zone allocated to the user terminal, and allocating an availability zone indicated by the successfully matched availability zone identification to the user terminal, in response to the successful matching of the user identification and the target logical availability zone identification with the availability zone allocation table.

3. The method according to claim 1, before the acquiring weights of availability zones from a preset availability zone weight table, further comprising:
  analyzing statistically a remaining amount of resources of the availability zones; calculating the weights of the availability zones; and writing the weights in the preset availability zone weight table, wherein the weights of the availability zones are proportional to the remaining amount of resources of the availability zones.

4. The method according to claim 1, wherein the availability zone weight table further comprises availability zone identifications of the availability zones, and the method further comprises:
  acquiring an availability zone identification of the selected target availability zone from the availability zone weight table.

5. The method according to claim 4, further comprising:
  writing the user identification, the target logical availability zone identification and the availability zone identification of the selected target availability zone respectively in the availability zone allocation table.

6. An apparatus for allocating an availability zone, comprising:
  at least one processor; and
  a memory storing instructions, which when executed by the at least one processor, cause the at least one processor to perform operations, the operations comprising:
  receiving an availability zone allocating request sent from a user terminal, the availability zone including at least one data center, the availability zone allocating request including a user identification and a target logical availability zone identification, a logical availability zone identification being an identification of a logical availability zone displayed to the user terminal;
  matching the user identification and the target logical availability zone identification with a user identification allocated with an availability zone and a logical availability zone identification of the availability zone allocated to the user terminal in an availability zone allocation table, the availability zone allocation table further including an availability zone identification of the availability zone allocated to the user terminal; and
  acquiring weights of availability zones from a preset availability zone weight table, select a target availability zone from the availability zones by using a ratio of a weight of an availability zone to a sum of the weights of the availability zones as a selection probability, and allocate the target availability zone to the user terminal, in response to an unsuccessful matching of the user identification and the target logical availability zone identification with the availability zone allocation table;
  wherein the selecting a target availability zone from the availability zones by using a ratio of a weight of an availability zone to a sum of the weights of the availability zones as a selection probability comprises:
  generating a weight wheel diagram, wherein the weight wheel diagram is equally divided into a first preset number of sectors, the first preset number of sectors equaling to the sum of the weights of the availability zones, a number of sectors occupied by an availability zone in the weight wheel diagram equaling to a weight of the availability zone;
  generating a random number, and generating a random rotating sector number H utilizing the following formula:

$$H=R \% W$$

wherein R is the random number, W is the sum of the weights of the availability zones, and % is a complementation operator;
  presetting a starting point in the weight wheel diagram and rotating H number of sectors clockwise or anti-clockwise around the weight wheel diagram to reach a terminal point; and
  defining an availability zone indicated by the terminal point as the target availability zone.

7. The apparatus according to claim 6, the operations further comprising:
  acquiring a successfully matched availability zone identification of the availability zone allocated to the user terminal, and allocating an availability zone indicated by the successfully matched availability zone identification to the user terminal, in response to the successful matching of the user identification and the target logical availability zone identification with the availability zone allocation table.

8. The apparatus according to claim 6, before the acquiring weights of availability zones from a preset availability zone weight table, the operations further comprising:
  analyzing statistically a remaining amount of resources of the availability zones; calculating the weights of the availability zones; and writing the weights in the preset availability zone weight table, wherein the weights of the availability zones are proportional to the remaining amount of resources of the availability zones.

9. The apparatus according to claim 6, wherein the availability zone weight table further comprises availability zone identifications of the availability zones, the operations further comprising:
  acquiring an availability zone identification of the selected target availability zone from the availability zone weight table.

10. The apparatus according to claim 9, the operations further comprising:
  writing the user identification, the target logical availability zone identification and the availability zone identification of the selected target availability zone respectively in the availability zone allocation table.

11. A non-transitory computer storage medium storing a computer program, which when executed by one or more processors, cause the one or more processors to perform operations, the operations comprising:
  receiving an availability zone allocating request sent from a user terminal, the availability zone including at least one data center, the availability zone allocating request including a user identification and a target logical availability zone identification, a logical availability zone identification being an identification of a logical availability zone displayed to the user terminal;
  matching the user identification and the target logical availability zone identification with a user identification allocated with an availability zone and a logical availability zone identification of the availability zone allocated to the user terminal in an availability zone allocation table, the availability zone allocation table further including an availability zone identification of the availability zone allocated to the user terminal; and
  acquiring weights of availability zones from a preset availability zone weight table, selecting a target availability zone from the availability zones by using a ratio of a weight of an availability zone to a sum of the weights of the availability zones as a selection probability, and allocating the target availability zone to the user terminal, in response to an unsuccessful matching of the user identification and the target logical availability zone identification with the availability zone allocation table;
  wherein the selecting a target availability zone from the availability zones by using a ratio of a weight of an availability zone to a sum of the weights of the availability zones as a selection probability comprises:
    generating a weight wheel diagram, wherein the weight wheel diagram is equally divided into a first preset number of sectors, the first preset number of sectors equaling to the sum of the weights of the availability zones, a number of sectors occupied by an availability zone in the weight wheel diagram equaling to a weight of the availability zone;
    generating a random number, and generating a random rotating sector number H utilizing the following formula:

$H = R \% W$ wherein R is the random number, W is the sum of the weights of the availability zones, and % is a complementation operator;
    presetting a starting point in the weight wheel diagram and rotating H number of sectors clockwise or anticlockwise around the weight wheel diagram to reach a terminal point; and
    defining an availability zone indicated by the terminal point as the target availability zone.

12. The non-transitory computer storage medium according to claim 11, the operations further comprising:
  acquiring a successfully matched availability zone identification of the availability zone allocated to the user terminal, and allocating an availability zone indicated by the successfully matched availability zone identification to the user terminal, in response to the successful matching of the user identification and the target logical availability zone identification with the availability zone allocation table.

13. The non-transitory computer storage medium according to claim 11, before the acquiring weights of availability zones from a preset availability zone weight table, the operations further comprising:
  analyzing statistically a remaining amount of resources of the availability zones; calculating the weights of the availability zones; and writing the weights in the preset availability zone weight table, wherein the weights of the availability zones are proportional to the remaining amount of resources of the availability zones.

14. The non-transitory computer storage medium according to claim 11, wherein the availability zone weight table further comprises availability zone identifications of the availability zones, and the operations further comprising:
  acquiring an availability zone identification of the selected target availability zone from the availability zone weight table.

15. The non-transitory computer storage medium according to claim 14, the operations further comprising:
  writing the user identification, the target logical availability zone identification and the availability zone identification of the selected target availability zone respectively in the availability zone allocation table.

* * * * *